(12) United States Patent
Mitsuyasu

(10) Patent No.: US 9,656,655 B2
(45) Date of Patent: May 23, 2017

(54) RUNNING CONTROL SYSTEM FOR VEHICLE

(75) Inventor: Masaki Mitsuyasu, Kawasaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/424,125

(22) PCT Filed: Sep. 3, 2012

(86) PCT No.: PCT/JP2012/072318
§ 371 (c)(1),
(2), (4) Date: Feb. 26, 2015

(87) PCT Pub. No.: WO2014/033947
PCT Pub. Date: Mar. 6, 2014

(65) Prior Publication Data
US 2015/0210261 A1 Jul. 30, 2015

(51) Int. Cl.
| | |
|---|---|
| *B60W 30/04* | (2006.01) |
| *B60W 10/02* | (2006.01) |
| *F16D 48/06* | (2006.01) |
| *F16D 48/02* | (2006.01) |
| *B60W 10/04* | (2006.01) |
| *F02D 29/02* | (2006.01) |
| *F02D 41/02* | (2006.01) |
| *F02D 41/10* | (2006.01) |
| *F02D 41/08* | (2006.01) |
| *F02D 41/14* | (2006.01) |

(52) U.S. Cl.
CPC ............ *B60W 10/02* (2013.01); *B60W 10/04* (2013.01); *F02D 29/02* (2013.01); *F02D 41/022* (2013.01); *F02D 41/107* (2013.01); *F16D 48/02* (2013.01); *F16D 48/06* (2013.01); *B60W 2710/02* (2013.01); *B60W 2720/10* (2013.01); *F02D 41/0225* (2013.01); *F02D 41/08* (2013.01); *F02D 2041/1412* (2013.01); *F02D 2200/501* (2013.01); *F02D 2200/702* (2013.01);
(Continued)

(58) Field of Classification Search
CPC ........................................... B60W 2030/1809
See application file for complete search history.

(56) References Cited

U.S. PATENT DOCUMENTS

| | | | | |
|---|---|---|---|---|
| 6,033,340 A | * | 3/2000 | Amendt | B60W 10/02 192/3.58 |
| 8,057,356 B2 | * | 11/2011 | Benz | F16D 48/06 477/175 |

(Continued)

FOREIGN PATENT DOCUMENTS

| | | |
|---|---|---|
| DE | 102010003673 A1 | 10/2011 |
| EP | 1455108 A1 | 9/2004 |

(Continued)

OTHER PUBLICATIONS

Translation of JP2012030709A, Apr. 15, 2016.*

*Primary Examiner* — Tisha Lewis
(74) *Attorney, Agent, or Firm* — Andrews Kurth Kenyon LLP

(57) ABSTRACT

A running control system for vehicles is provided to reduce engagement shocks of a clutch and to raise the torque of drive wheels quickly upon satisfaction of a condition of engagement of the clutch. In a vehicle to which the running control system is applied, power transmission between an engine and the drive wheels is selectively enabled by the clutch. The running control system is configured to raise a speed of the engine from an idling speed if the clutch is expected to be engaged during coasting where the clutch is in disengagement to interrupt a torque transmission between the engine and the drive wheels.

4 Claims, 5 Drawing Sheets

(52) U.S. Cl.
CPC ........... *F16D 2500/10412* (2013.01); *F16D 2500/3027* (2013.01); *F16D 2500/3067* (2013.01); *F16D 2500/5085* (2013.01); *F16D 2500/70408* (2013.01)

(56) References Cited

U.S. PATENT DOCUMENTS

| | | |
|---|---|---|
| 2004/0138027 A1 | 7/2004 | Rustige et al. |
| 2004/0176213 A1 | 9/2004 | Benz et al. |
| 2013/0116906 A1* | 5/2013 | Christen ............... B60W 10/02 701/93 |
| 2013/0184923 A1* | 7/2013 | Sawayama ............. B60L 11/14 701/22 |

FOREIGN PATENT DOCUMENTS

| | | | |
|---|---|---|---|
| EP | 2327901 A1 | 6/2011 | |
| JP | 11122712 A | 4/1999 | |
| JP | 11200909 A * | 7/1999 | ............ B60K 31/00 |
| JP | 2000303871 | 10/2000 | |
| JP | 2004-270944 A | 9/2004 | |
| JP | 2005-042814 A | 2/2005 | |
| JP | 2010-281384 A | 12/2010 | |
| JP | 2011-219087 A | 11/2011 | |
| JP | 2012030709 A * | 2/2012 | ............ B60W 10/02 |
| WO | 02/094601 A2 | 11/2002 | |

* cited by examiner

RUNNING CONTROL SYSTEM FOR VEHICLE

CROSS-REFERENCE TO RELATED APPLICATION

This is a national phase application based on the PCT International Patent Application No. PCT/JP2012/072318 filed Sep. 3, 2012, the entire contents of which are incorporated herein by reference.

TECHNICAL FIELD

The present invention relates to a control system for controlling a driving force and a braking force during propelling a vehicle, and more particularly, to a running control system for controlling a coasting of the vehicle.

BACKGROUND ART

A prime mover of a vehicle such as an internal combustion engine has to be operated at a speed higher than a self-sustaining speed, and even when the vehicle is stopped, the engine is activated for the purpose of generation and air conditioning. For these purposes, according to the conventional art, the engine is disconnected from a powertrain (or a gear train) by a clutch depending on the situation so that the engine is allowed to be activated to generate a power for electric generation even in the stopping vehicle. The engine generates not only a power for propelling the vehicle but also an engine braking force resulting from a pumping loss of the engine. When the vehicle is coasting without being powered by the engine, the engine is disconnected from the powertrain by bringing the clutch into disengagement to reduce power loss resulting from rotating the prime mover passively. Such drive mode in which the vehicle is coasting while disengaging the clutch is called a "neutral coasting (abbreviated as N coasting)". Under the neutral coasting, an inertia force of the vehicle may be utilized effectively so that fuel efficiency can be improved.

When an accelerator pedal or a brake pedal is depressed under the neutral coasting, the clutch is engaged to transmit engine power to the wheels and to apply the engine braking force to the vehicle. During the neutral coasting, the engine speed is reduced to the self-sustaining speed but rotary members of the powertrain are rotated at a higher speed according to a vehicle speed and a speed ratio. In this situation, if the clutch is brought into engagement, the engine speed will be abruptly raised by the inertia force of the vehicle to the speed according to the vehicle speed and the speed ratio. That is, the engine braking force derived from energy for increasing the engine speed is applied to the vehicle. This means that shocks may be caused by the engine braking force if the clutch is immediately brought into engagement upon depression of the accelerator pedal or the brake pedal.

Japanese Patent Laid-Open No. 2010-281384 describes a coasting control system for reducing such engagement shock of the clutch. According to the teachings of Japanese Patent Laid-Open No. 2010-281384, the control device is configured to adjust a speed ratio of a transmission disposed between a clutch and drive wheels during the neutral coasting, in a manner such that a rotational speed of an output member of the clutch is synchronized to that of an input member of the clutch. That is, the speed ratio of the transmission is adjusted in a manner such that an input speed of the transmission is synchronized to an idling speed of the engine.

Thus, the control device taught by Japanese Patent Laid-Open No. 2010-281384, the rotational speed of the input member of the clutch is synchronized to that of the output member of the clutch so that the clutch is allowed to be brought into engagement without changing rotational speed significantly. According to the teachings of Japanese Patent Laid-Open No. 2010-281384, therefore, shocks resulting from a change in a longitudinal acceleration of the vehicle may be reduced. However, when the clutch is brought into engagement, the engine speed is lowered to the idling speed and hence acceleration response would be degraded. That is, even if the throttle valve supplying fuel to the engine is opened widely to increase the engine speed after engaging the clutch, it would take more time to achieve a desired engine speed due to the inertial mass of the engine, the transmission etc. Consequently, it will take more time to achieve a desired drive torque transmitted to the drive wheels.

DISCLOSURE OF THE INVENTION

The present invention has been conceived noting the foregoing technical problem, and it is therefore an object of the present invention is to provide a running control system configured to soften engagement shocks of a clutch under a neutral coasting, and to raise drive torque promptly to a desired value upon satisfaction of a condition to bring the clutch into engagement.

The running control system of the present invention is applied to a vehicle having an engagement device that is disposed between a prime mover and drive wheels to selectively enable power transmission therebetween. In order to achieve the above-explained objective, according to the present invention, the running control system is configured to raise a speed of the prime mover from an idling speed, if the engagement device is expected to be brought into engagement during coasting of the vehicle in which the engagement device is in disengagement to interrupt a torque transmission between the prime mover and the drive wheels.

According to the present invention, specifically, the speed of the prime mover is raised in accordance with a probability of engagement of the engagement device.

The aforementioned probability of engagement of the engagement device is determined based on a current running environment or running condition of the vehicle.

More specifically, the speed of the prime mover is raised during the coasting to a maximum speed thereof to be achieved by bringing the engagement device into engagement during the coasting.

In the vehicle, a transmission is disposed between the engagement device and the drive wheels to alter a speed ratio therebetween. In addition, the maximum speed of the prime mover is calculated based on a speed of the vehicle and a speed ratio of the transmission.

For example, the engagement device is brought into engagement when the vehicle is required to be accelerated. By contrast, the engagement device is also brought into engagement when the vehicle is required to be decelerated.

Thus, according to the present invention, the speed of the prime mover is raised from the idling speed during the coasting if the engagement device is expected to be brought into engagement. That is, the speed of the prime mover can be raised toward to a target speed prior to the engagement of the engagement device so that engagement shocks of the engagement device can be reduced. Therefore, the engagement device is allowed to be brought into engagement without waiting for an increment of the speed of the prime mover. Additionally, since the speed of the prime mover is thus raised beforehand of engagement of the engagement device, a reaction of the torque increasing the speed of the prime mover can be reduced so that the speed of the prime mover can be raised quickly. Consequently, fuel consumption can be reduced. Further, since the engagement device is brought into engagement while increasing the speed of the prime mover, the vehicle can be accelerated or an engine braking force can be applied to the vehicle as soon as bringing the engagement device into engagement. Consequently, the torque of the drive wheels can be increased to a desired level in short time.

As described, the speed is of the prime mover is raised in accordance with the degree of probability of engagement of the engagement device. In this case, the speed difference of the prime mover before and after the engagement of the engagement device can be further reduced so that the engagement device is allowed to be brought into engagement more quickly.

As also described, the speed of the prime mover is raised to the maximum speed thereof in case of engaging the engagement device during coasting. That is, the speed of the prime mover will not be raised excessively during coasting. Therefore, the fuel will not be wasted to increase the speed of the prime mover unnecessarily.

DESCRIPTION OF THE PREFERRED EMBODIMENT(S)

Figure 5:
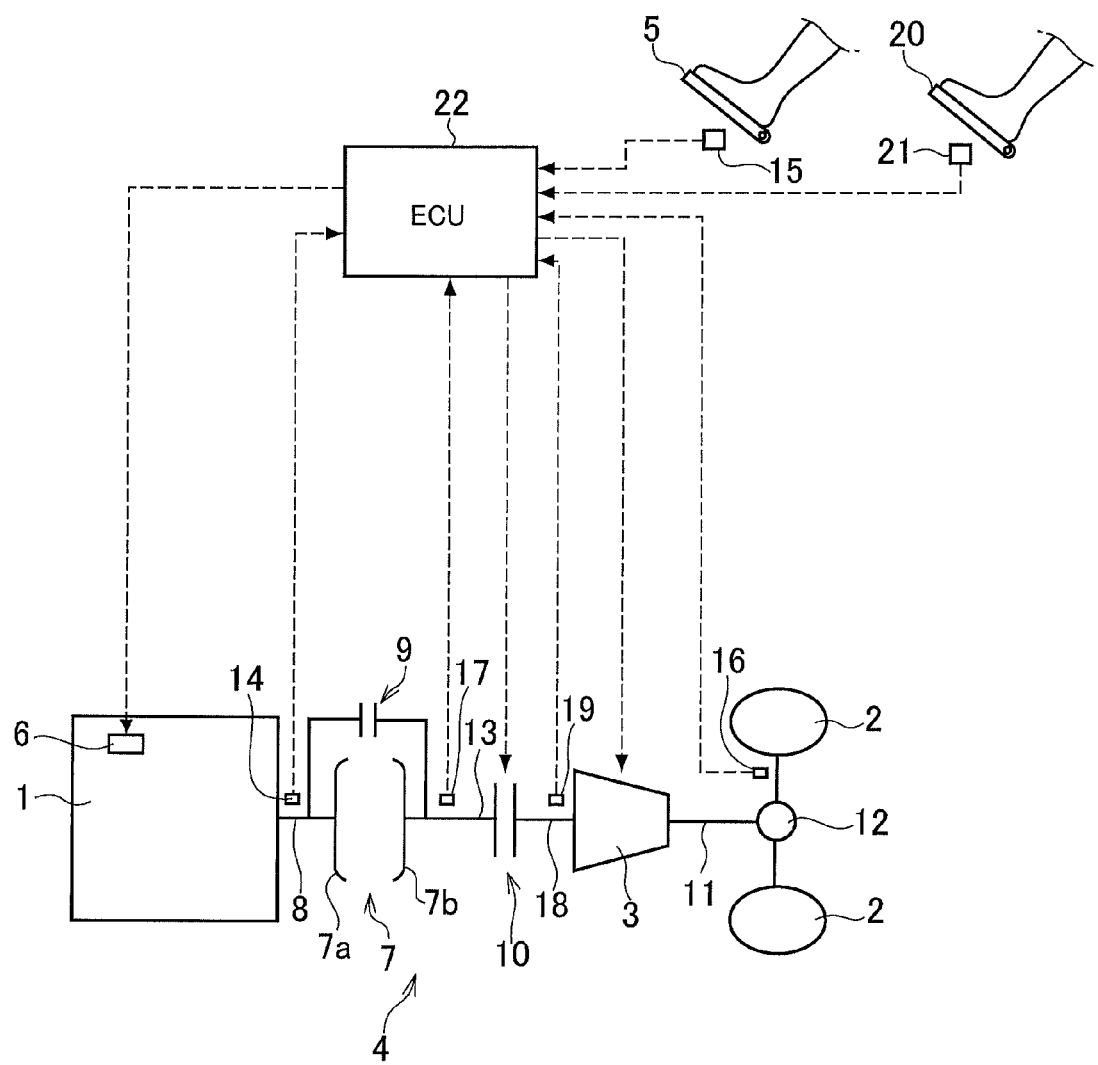
FIG. 5 is a schematic illustration of a powertrain of the vehicle.

Next, a preferred example of the running control system according to the present invention will be explained hereinafter. Referring now to FIG. 5, there is shown a preferred example of a powertrain to which the present invention is applied. As shown in FIG. 5, a powertrain 4 comprises a transmission 3 that transmits power of a prime mover 1 to drive wheels 2 while changing a rotational speed and a torque. For example, a gasoline engine, a diesel engine and etc. may be used as the prime mover (as will be called the "engine" hereinafter) 1. Fuel supply to the engine 1 is controlled in a manner to achieve a desired drive torque by altering an opening degree of a throttle valve 6 according to a depression of an accelerator pedal 5. Specifically, if a depression of the accelerator pedal 5 is increased, an opening degree of the throttle valve 6 is increased to generate larger engine power. By contrast, if a depression of the accelerator pedal 5 is decreased, an opening degree of the throttle valve 6 is decreased to reduce the engine power.

As illustrated in FIG. 5, an output shaft 8 of the engine 1 is joined to a fluid coupling (as will be called the "torque converter" hereinafter) 7 as a torque multiplier having a lockup clutch 9 that selectively connects an input member 7a to an output member 7b of the torque converter 7 to rotate integrally. For example, when the lockup clutch 9 is brought into disengagement, the torque converter 7 is allowed to multiply the engine torque transmitted from the input member 7a to the output member 7b through fluid flow. Alternatively, the engine torque may also be transmitted to the output member 7b without being multiplied by bringing the lockup clutch 9 into engagement.

The power transmitted to the torque converter 7 is further transmitted to the transmission 3 through a clutch 10, and the drive wheels 2 are connected to an output shaft 11 of the transmission 3 through a differential gear unit 12. Thus according to the example shown in FIG. 5, the transmission 3 is connected to an output shaft 13 of the torque converter 7 through the clutch 10. Accordingly, the clutch 10 serves as the claimed "engagement device" for selectively enable a power transmission between the engine 1 and the drive wheels 2. Alternatively, a transmission having a clutch for establishing a gear stage may also be employed in the powertrain (or gear train) 4. In this case, the clutch of the transmission for establishing a gear stage serves as the claimed "engagement device" for selectively enable a power transmission between the engine 1 and the drive wheels 2. In the transmission of this kind, if a plurality of clutches are used to establish a gear stage, any one of the clutches serves as the claimed "engagement device" for selectively enable a power transmission between the engine 1 and the drive wheels 2. Further, according to the preferred example, the transmission for transmitting engine torque may include a geared transmission or a continuously variable transmission.

The powertrain 4 shown in FIG. 5 is further provided with a sensor 14 for detecting an engine speed (Ne), a sensor 15 for detecting a depression of the accelerator pedal 5, a sensor 16 for detecting a vehicle speed, a sensor 17 for detecting a rotational speed of the output shaft 13 of the torque converter 7, a sensor 19 for detecting a rotational speed of the output a shaft 18 of the transmission 3, and a sensor 21 for detecting a depression of a brake pedal 20. Detection signals of those sensors are sent to an electronic control unit (to be abbreviated as the "ECU" hereinafter) 22. Specifically, the ECU 22 is comprised mainly of a RAM temporarily storing incident signals, a ROM storing maps and formulas prepared based on experimentation or simulation, and a CPU that carries out a calculation based on the signals stored in RAM and the maps or the formulas stored in the ROM. An opening degree of the throttle valve 6, a speed ratio of the transmission 3, an actuator for actuating the clutch 10 and so on are controlled in accordance with the incident signals of the ECU 22.

If none of the accelerator pedal 5 and the brake pedal 20 are depressed, in other words, if none of driving force and the braking force are demanded during running, the clutch 10 disposed between the engine 1 and the driving wheels 2 is brought into disengagement to disconnect the engine 1 from the driving wheels 2 so that the vehicle is allowed to coast. Hereinafter, such drive mode to coast the vehicle while disengaging the clutch 10 will be called the "neutral coasting". When the accelerator pedal 5 or the brake pedal 20 is depressed during the neutral coasting, the clutch 10 is brought into engagement to connect the engine 1 with the driving wheels 2. For instance, if driving force is demanded by the driver during the neutral coasting, the clutch 10 is brought into engagement to connect the engine 1 with the driving wheels 2 to enable a power transmission therebetween. By contrast, if braking force is demanded by the driver during the neutral coasting, the clutch 10 is brought into engagement to connect the engine 1 with the driving wheels 2 to apply an engine braking force.

Figure 1:
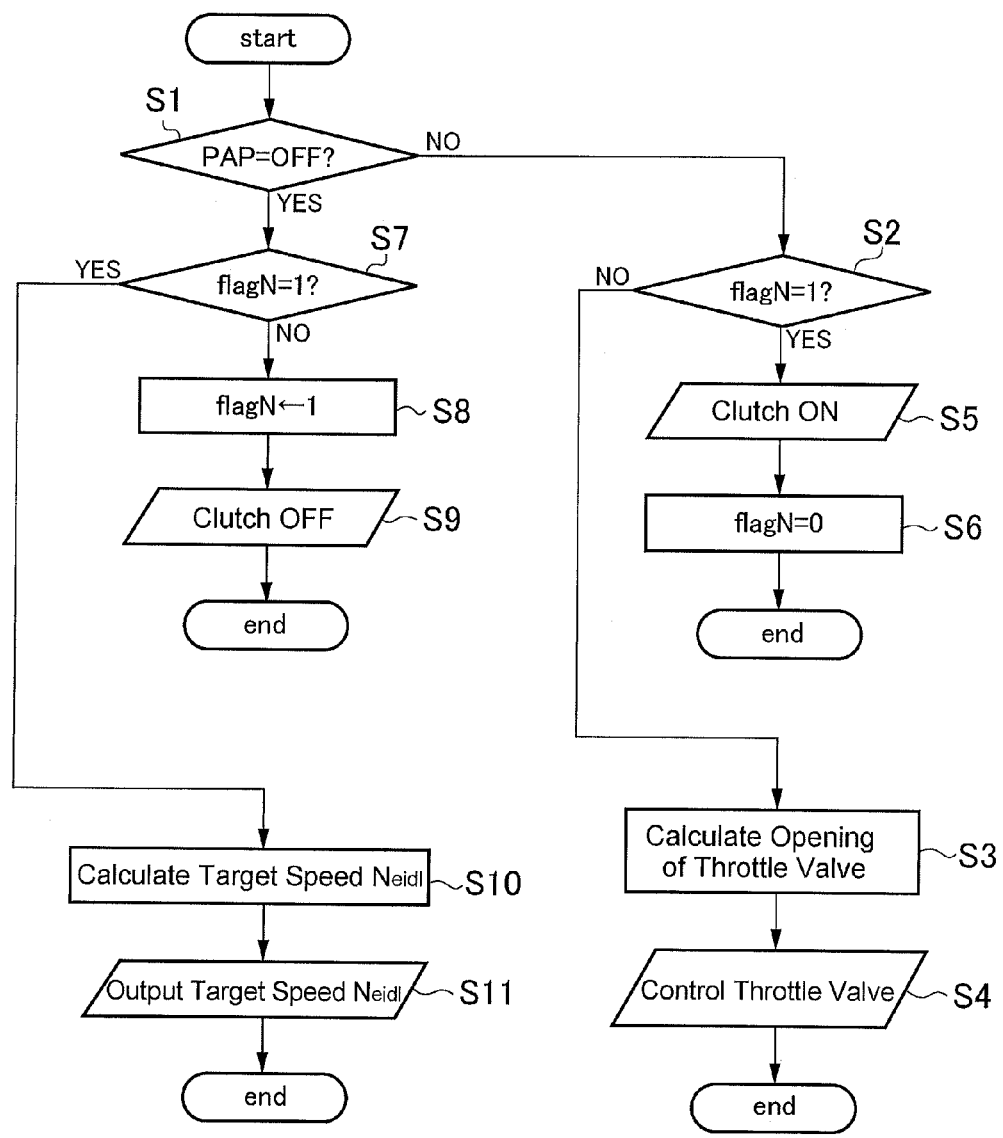
FIG. 1 is a flowchart showing a control example carried out by the running control system for vehicle according to the present invention.

The running control system of the present invention is configured to increase speed of the engine 1 when the neutral coasting is expected to be terminated to transmit the engine power to the drive wheels 2 by bring the clutch 10 into engagement. An example of such control will be explained with reference to a flowchart shown in FIG. 1, and the control shown therein is repeated at predetermined intervals. Specifically, FIG. 1 shows an example to be carried out under the condition where the accelerator pedal 5 is depressed so that the drive mode is returned from the neutral coasting to a normal mode in which the vehicle is propelled by transmitting the engine power to the drive wheels 2.

First of all, it is determined whether or not the accelerator pedal 5 is depressed (at step S1). Specifically, an opening degree of the accelerator (PAP) is detected by the sensor 15 adapted to detect depression of the accelerator pedal 5, and the detected opening degree of the accelerator is compared to a predetermined reference degree. That is, at step S1, it is determined whether or not the torque is demanded by the driver. Specifically, if the torque is not demanded, the vehicle is allowed to coast under the neutral coasting. By contrast, if the torque is demanded, the vehicle is preferably propelled under the normal mode. If the accelerator pedal 5 is depressed deeply to open the accelerator wider than the predetermined degree so that the answer of step S1 is NO, it is determined whether or not an execution flag N of the neutral coasting turned to "1" during the previous routine is currently "1" (at step S2). Specifically, the execution flag N shown in FIG. 1 is turned to "1" to indicate a fact that the vehicle coasts under the neutral coasting while bringing the clutch 10 into disengagement, and turned to "0" to indicate a fact that the vehicle is powered by the engine 1 while bringing the clutch 10 into engagement, that is, the vehicle is propelled under the normal mode.

If the execution flag N of the neutral coasting is currently not "1", that is, if the vehicle is currently propelled under the normal mode so that the answer of the step S2 is NO, an opening degree of the throttle valve 6 is calculated based on the opening degree of the accelerator (at step S3). Then, the opening degree of the throttle valve 6 is adjusted in accordance with the calculated value of step S3 (at step S4), and the routine is ended. Thus, in case the answer of step S2 is NO, the power of the engine is controlled in a manner to maintain the vehicle to be propelled under the normal mode.

By contrast, if the execution flag N of the neutral coasting is currently "1", that is, if the vehicle currently coasts under the neutral coasting so that the answer of the step S2 is YES, the clutch 10 is brought into engagement to enable power transmission between the engine 1 and the drive wheels 2 (at step S5). Then, the execution flag N of the neutral coasting is turned to "0" (at step S6), and the routine is ended. That is, in case the answer of step S2 is YES, the neutral coasting is terminated to propel the vehicle under the normal mode by bringing the clutch 10 into engagement to enable power transmission between the engine 1 and the drive wheels 2.

Thus, if the answer of step S1 is NO, the vehicle is continuously propelled under the normal mode or the drive mode is shifted to the normal mode. By contrast, in case the answer of step S1 is YES, that is, in case the vehicle is allowed to coast under the neutral coasting, the neutral coasting is continued or the vehicle is brought into the neutral coasting by carrying out the following procedures. In this case, it is determined whether or not the execution flag N of the neutral coasting is currently "1" (at step S7). That is, it is judged whether or not the vehicle coasted under the neutral coasting during the previous routine. If the vehicle was propelled under the normal mode during the previous routine so that the answer of step S7 is NO, the execution flag N of the neutral coasting is turned to "1" (at step S8). Then, the clutch 10 is brought into disengagement to disconnect the engine 1 from the drive wheels 2 to allow the vehicle to coast under the neutral coasting, and the routine is ended (at step S9). Here, the routine shown in FIG. 1 is repeated at predetermined intervals as mentioned above, and a target speed of the engine 1 will be determined at the after-mentioned steps S10 and S11. Therefore, speed of the engine 1 is not especially controlled at step S9.

If the vehicle coasted under the neutral coasting during the previous routine so that the answer of step S7 is YES, the target speed of the engine Neidl is calculated based on current running environment around the vehicle or current running condition of the vehicle (at step S10). Then, the engine speed is adjusted in accordance with the target speed of the engine Neidl calculated at step S10 (at step S11), and the routine is ended. Here, the engine speed may be controlled by adjusting the fuel supply to the engine 1 e.g., by altering an opening degree of a throttle valve 6, and control method should not be limited to a specific method.

The target speed of the engine Neidl calculated at step S10 will be explained in more detail. If the drive mode is expected to be returned from the neutral coasting to the normal mode in accordance with the current condition of the vehicle, the target speed of the engine Neidl calculated at S10 is adjusted depending on the degree of probability or possibility of termination of the neutral coasting. Specifically, given that the probability of shifting from the neutral coasting to the normal mode is low, the rotational speed of the engine 1 speed is maintained to the idling speed. By contrast, given that the probability of shifting from the neutral coasting to the normal mode is high, the target speed of the engine Neidl is set to a higher value in accordance with the probability. Specifically, the target speed of the engine Neidl is calculated using the following formulas:

$$Ne\max = spd \times \gamma \times K \quad (1); \text{ and}$$

$$Neidl = (Ne\max - Ne\min) \times \alpha + Ne\min \quad (2).$$

In the formula (1), Nemax is a maximum speed of the engine 1 during the neutral coasting, spd is a vehicle speed, $\gamma$ is a speed ratio of a transmission 3, and K is a constant for converting a value calculated based on a vehicle speed and a speed ratio into a rotational speed. The speed ratio of the transmission 3 is governed by the opening degree of the throttle valve 6 and the vehicle speed, and determined with reference to a map for the normal mode. Specifically, the speed ratio of a case in which an opening degree of the accelerator is "0" and the lockup clutch 9 is in engagement is used to calculate the maximum speed Nemax. Specifically, the maximum speed Nemax is calculated using the formula (1) in a manner such that the rotational speed of the engine 1 will not be changed even after the clutch 10 is brought into engagement.

In the formula (2), Nemin is the idling speed of the engine 1 at which power generation and air conditioning can be ensured and the oil pump can be driven, and $\alpha$ is a correction coefficient determined based on probability or possibility of shifting from the neutral coasting to the normal mode. Thus, as expressed by the formula (2), the target speed of the engine Neidl is calculated within a range from the maximum speed during the neutral coasting and the idling speed of the engine 1.

Figure 2:
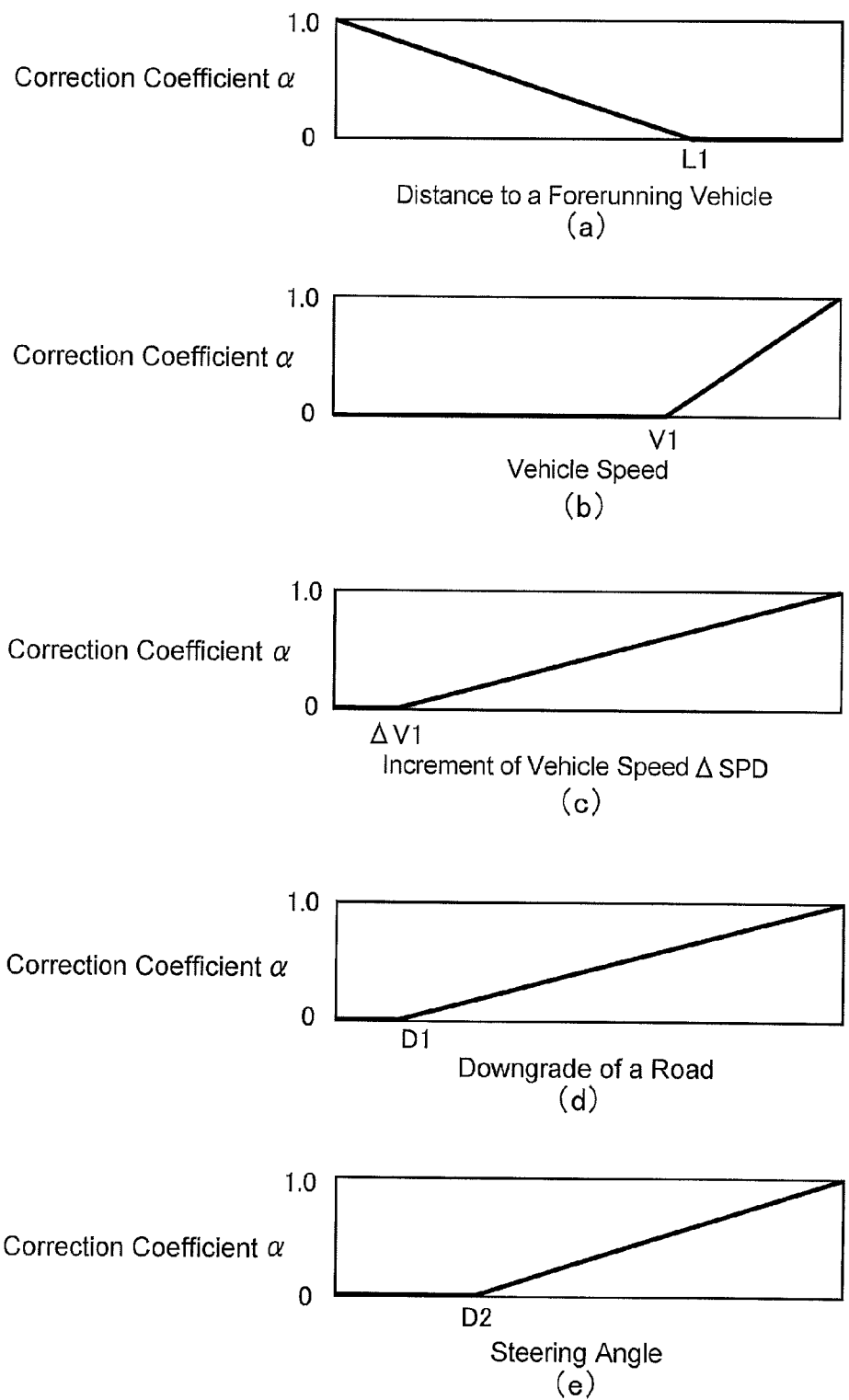
FIG. 2 shows maps determining a correction coefficient based on distance to a forerunning vehicle, vehicle speed, increment of vehicle speed, downgrade of a road, and steering angle.

Here will be explained the correction coefficient α determined based on the degree of probability of shifting from the neutral coasting to the normal mode. In FIG. 2, there are shown maps for determining the correction coefficient α, and those maps are preinstalled in the ECU 22 based on experimentation or the like. For example, FIG. 2(*a*) is a map for determining the correction coefficient cc based on distance to a forerunning vehicle. When a distance to the forerunning vehicle is reduced to be shorter than a predetermined distance L1, the vehicle is expected to be decelerated by depressing the brake pedal 20 or to be accelerated by depressing the accelerator pedal 5 while changing a lane. When the brake pedal 20 or the accelerator pedal 5 is depressed so that the neutral coasting is terminated, shocks are caused as a result of bringing the clutch 10 into engagement. Specifically, an engine speed will be raised abruptly by bringing the clutch 10 into engagement and consequently the vehicle is subjected to an engine braking force. In order to mitigate such engagement shocks, when the vehicle comes closer to the forerunning vehicle than the predetermined distance L1, the correction coefficient cc is increased to raise the engine speed in advance with a decrement of the distance to the forerunning vehicle. For this purpose, the distance to the forerunning vehicle may be detected by a navigation system or a RADAR.

Next, an example for determining the correction coefficient α based on the vehicle speed will be explained with reference to a map shown in FIG. 2(*b*). If the vehicle speed detected by the sensor 16 is high, the vehicle is anticipated to be decelerated to reduce the vehicle speed or to keep a sufficient distance to a forerunning vehicle. Instead, if the vehicle comes too close to the forerunning vehicle, the vehicle will be accelerated while changing a lane. For those purposes, when the vehicle speed exceeds a predetermined speed V1, the correction coefficient α is increased to raise the engine speed in advance with an increment of the vehicle speed.

The correction coefficient α may be increased based not only on the vehicle speed but also on parameters to be described below. If a vehicle speed is increased significantly from the commencement of the neutral coasting, the neutral coasting is expected to be terminated. Likewise, if the vehicle runs on a downgrade, the vehicle speed will be increased and hence the neutral coasting is expected to be terminated. Specifically, in case an increment of vehicle speed is larger than a predetermined increment of vehicle speed ΔV1, the correction coefficient α is increased with the increment of vehicle speed as indicated in FIG. 2 (*c*). Likewise, in case a downgrade of a road is steeper than a predetermined degree D1, the correction coefficient α is increased with an increment of the downgrade as indicated in FIG. 2 (*d*). To this end, the downgrade of a road may be detected by an acceleration (G) sensor.

By contrast, if a steering operation is performed to turn the vehicle, the brake pedal 21 is anticipated to be depressed to decelerate the vehicle especially in a case that a steering wheel is rotated significantly. In this case, if the steering angle is greater than a predetermined angle D2, the correction coefficient α is increased with an increment of the steering angle as indicated in FIG. 2 (*e*). To this end, specifically, the correction coefficient α is calculated based on an absolute value of the steering angle so as to determine the correction coefficient α irrespective of a turning direction. In addition, a curvature of the road on which the vehicle is running may be detected using a navigation system so that the probability to make a turn can be determined in advance. In this case, specifically, the correction coefficient α is determined based on the curvature of the road (or a turning radius of the vehicle).

Thus, in the examples shown in FIG. 2, the correction coefficients α is increased in proportion to a change in each parameter such as a distance to the forerunning vehicle, a vehicle speed, an increment of vehicle speed, a downgrade of a road, and a steering angle. However, the correction coefficients α is not necessarily to be increased proportional to such increment of the probability of termination of the neutral coasting. In those maps, the reference values for changing the correction coefficients α such as the predetermined distance L1, the predetermined speed V1, the predetermined increment of vehicle speed ΔV1, the predetermined degree D1 and the predetermined angle D2 may be determined arbitrarily based on experimentation or simulation.

As described above, a probability of the brake pedal 21 or the accelerator pedal 5 to be depressed is determined based on current conditions of the vehicle, and the correction coefficient α is increased in accordance with a degree of probability to raise the engine speed during the neutral coasting so that difference between the engine speeds before and after engaging the clutch 10 can be diminished. Consequently, engagement shocks of the clutch 10 may be softened. In addition, since the engine speed is thus raised before the accelerator pedal 5 is depressed, the vehicle is allowed to be accelerated immediately by depressing the accelerator pedal 5 when the clutch 10 is brought into engagement to terminate the neutral coasting. That is, the torque can be raised immediately so that acceleration response can be enhanced. Therefore, a load derived from weights of the vehicle and the transmission 3 can be lightened when raising the engine speed so that the energy efficiency or the fuel economy can be improved.

In addition, the vehicle can be prevented from being subjected to an excessive engine braking force when terminating the neutral coasting by depressing the brake pedal 21 so that shocks can be reduced when decelerating the vehicle. Further, a slippage of the clutch 10 can be reduced when bringing the clutch 10 into engagement so that the engine braking force can be applied immediately to the vehicle. That is, the braking torque can be established immediately so that deceleration response can be enhanced.

Thus, when the clutch 10 is expected to be engaged, the engagement shocks of the clutch 10 can by reduced by raising the engine speed. As also described, the vehicle is allowed to be accelerated with an enhanced response by depressing the accelerator pedal 5, and to be decelerated with an enhanced response by depressing the brake pedal 21. That is, desired drive torque and brake torque can be applied to the drive wheels immediately in response to an acceleration demand and a deceleration demand of the driver. As also described, the maximum engine speed is set to a value at which the engine speed will not be changed after the engagement of the clutch 10. Therefore, the engine speed will not be raised excessively during the neutral coasting so that the fuel can be prevented from being wasted.

Figure 3:
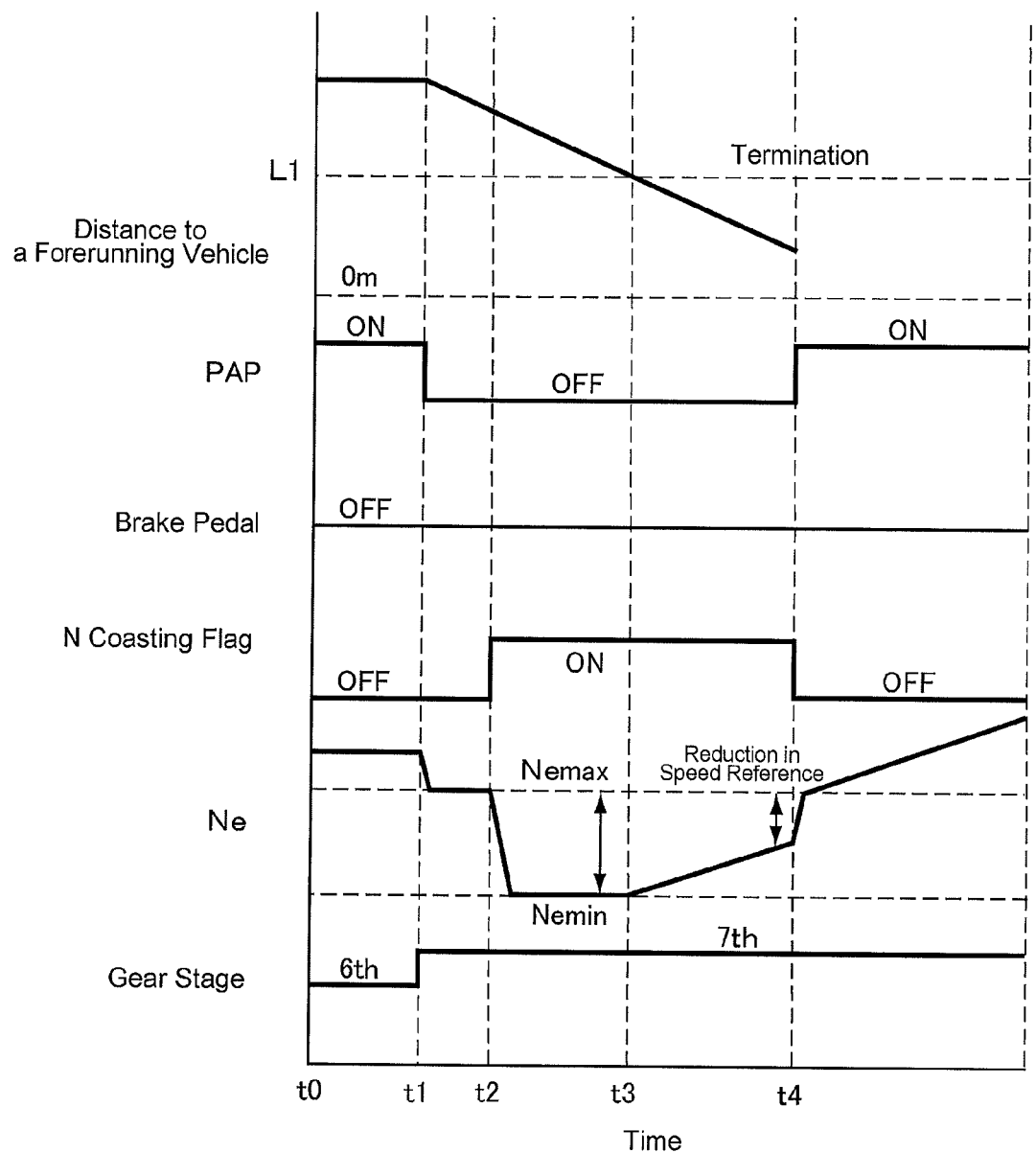
FIG. 3 is a time chart illustrating changes in distance to a forerunning vehicle, a status of an accelerator, operation of a brake pedal, N coasting flag, engine speed and gear stage, when an acceleration is demanded under the neutral coasting.

Here will be explained changes in the opening degree of the accelerator, the operating status of the brake pedal 21, the engine speed, the flag representing a running condition (i.e., "flag N" in FIG. 3) during execution of the control shown in FIG. 1 with reference to a time chart shown in FIG. 3. Specifically, FIG. 3 shows an example in which the control shown in FIG. 1 is carried out under the situation where the vehicle comes close to the forerunning vehicle and therefore accelerated while changing a lane, and in FIG. 3, a horizontal axis represents a lapse of time. In this case, the correction coefficient α is altered based on a distance to a forerunning vehicle, and the neutral coasting is terminated upon depression of the accelerator pedal 5. At point t0, the vehicle is propelled in the forward direction under the sixth stage by depressing the accelerator pedal 5 while keeping a distance to the forerunning vehicle further than the predetermined distance L1. That is, the vehicle is propelled under the normal condition and the execution flag N also shown in FIG. 1 is turned to "0". In this situation, the brake pedal 21 is not depressed.

Then, the accelerator pedal 5 is returned at point t1 to close the accelerator as indicated as "OFF". Consequently, the engine speed is lowered an upshifting is caused to shift the gear stage to the seventh stage. Such upshifting is carried out by the conventional transmission control as a result of returning the accelerator pedal at the vehicle speed higher than the predetermined speed. When a predetermined period of time has elapsed from the point t1 at which the accelerator pedal was returned to commence the coasting (at point t2), the flag N representing the running condition of the vehicle is turned to "ON" as indicated "1" in FIG. 1. Consequently, the clutch 10 is brought into disengagement and the engine speed starts lowering. Here, such predetermined period of time is ensured to determine a fact that the driver does not require the drive force, and to wait until the engagement pressure of the clutch involved in setting the current gear stage is stabilized. If the throttle valve 6 is abruptly closed in response to the return of the accelerator pedal 5, an internal pressure of the engine 1 would be reduced abruptly thereby aspirating engine oil into the engine 1. In order to avoid such disadvantage, the throttle valve 6 is closed by taking a predetermined period of time to lower the engine speed to the idling speed.

When the neutral coasting is commenced at the point t2, the distance to the forerunning vehicle is still maintained further than the predetermined distance L1 and the engine speed is therefore kept to the idling speed. In this situation, when vehicle comes closer to the forerunning vehicle than the predetermined distance L1 (at point t3), the engine speed starts to be increased toward the target speed of the engine Neidl by increasing the opening degree of the throttle valve 6.

Then, when the accelerator pedal 5 is depressed as indicated as "ON" (at point t4) during increasing the engine speed in accordance with the distance to the forerunning vehicle, the flag N is turned to "OFF". Consequently, the clutch 10 is brought into engagement to connect the engine 1 with the driving wheels 2 to enable a power transmission therebetween, and the throttle valve 6 is opened in accordance with the depression of the accelerator pedal 5 to increase the engine speed. As described, the time chart shown in FIG. 3 illustrates the situation where the vehicle comes close to the forerunning vehicle and changes the lane. Therefore, the line indicating the distance to the forerunning vehicle is omitted after the point t4 at which the vehicle starts running on a lane different from that of the forerunning vehicle.

Thus, according to the example shown in FIG. 3, the engine speed is raised before the engagement of the clutch 10 at the point t4 toward the target speed to be achieved after the point t4. Therefore, the clutch 10 is allowed to be brought into engagement immediately after depressing the accelerator pedal 5. That is, required time delay for the engagement of the clutch 10 can be shortened. Further, since the difference between the engine speeds before and after the engagement of the clutch 10 is thus reduced, the engagement shock of the clutch 10 can be reduced. Furthermore, since the engine speed is raised in advance of the engagement of the clutch 10, the output torque can be adjusted in accordance with the engine speed thus raised to achieve the required drive force. Additionally, during increasing the engine speed, a power loss is caused only by the engine 1 so that an energy loss, that is, the fuel consumption can be reduced.

Figure 4:
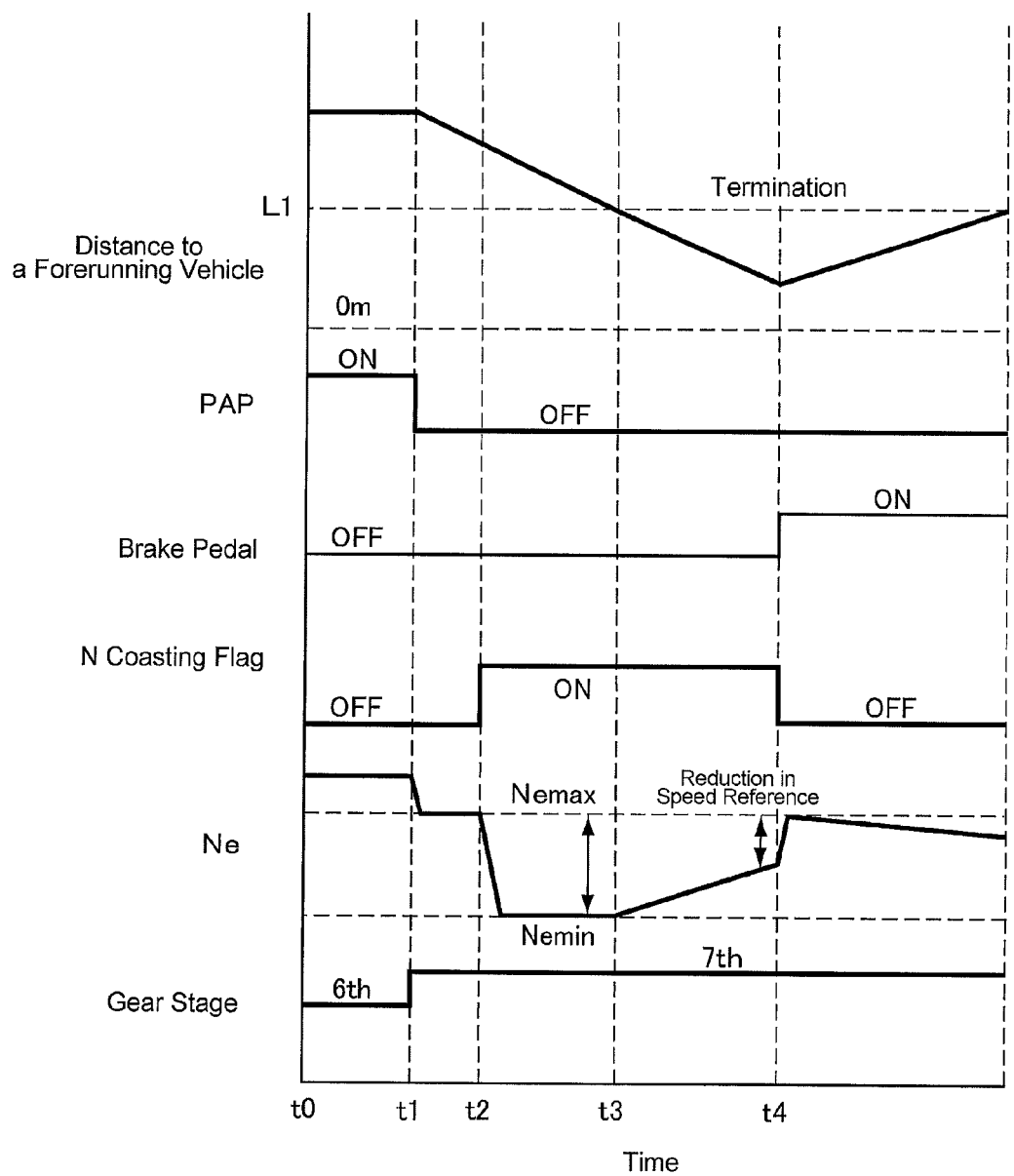
FIG. 4 is a time chart illustrating changes in distance to a forerunning vehicle, a status of an accelerator, operation of a brake pedal, N coasting flag, engine speed and gear stage, when a deceleration is demanded under the neutral coasting.

Here will be explained changes in the opening degree of the accelerator, the operating status of the brake pedal 21, the engine speed, the flag N representing a running condition under the situation where the vehicle comes close to the forerunning vehicle and therefore decelerated, with reference to a time chart shown in FIG. 4. In FIG. 4, a horizontal axis also represents a lapse of time, and changes in those factors from the point t0 to the point t4 are similar to those in FIG. 3. Therefore, detailed explanation for those changes from the point t0 to the point t4 will be omitted. According to the example shown in FIG. 4, the brake pedal 21 is depressed at the point t4 and the neutral coasting is terminated. Consequently, the flag N is turned to "OFF", and the clutch 10 is brought into engagement to connect the engine 1 with the driving wheels 2 to enable a power transmission therebetween. As a result, an engine braking force derived from the power loss of the engine 1 is applied to the driving wheels 2 so that the vehicle is decelerated to be distanced from the forerunning vehicle.

The engine speed is raised before the engagement of the clutch 10 toward the target speed to be achieved after the engagement also in case the brake pedal 21 is depressed to terminate the neutral coasting. Therefore, the vehicle can be prevented from being subjected to an abrupt engine braking force so that shocks can be reduced. Additionally, since the engine speed is raised after the depression of the brake pedal 21 to prevent the abrupt engine braking force, the required time delay for the engagement of the clutch 10 can be shortened. Consequently, the engine braking force can be applied immediately to the driving wheels 2 in response to the deceleration demand when depressing the brake pedal 21 thereby bringing the clutch 10 into engagement.

As described, according to the foregoing examples, the target speed of the engine Neidl during neutral costing is determined in a manner such that the engine speed will not be changed even after the engagement of the clutch 10. However, the maximum value of the target speed of the engine Neidl should not be limited to the specific value as long as the engine speed can be raised during the neutral coasting depending on the probability of termination of the neutral coasting. As also described, according to the foregoing examples, the engine 1 is disconnected from the driving wheels 2 and the engine speed is lowered to the idling speed during the neutral coasting. However, the engine speed may also be reduced to zero during the neutral coasting if the probability of terminating the neutral coasting is low.

The invention claimed is:
1. A running control system for a vehicle having an engagement device that is disposed between a prime mover and drive wheels to selectively enable power transmission therebetween,
wherein the running control system is configured
to detect at least one of a distance to a forerunning vehicle, a vehicle speed, an increment of vehicle speed, a downgrade of a road, a steering angle during coasting of the vehicle in which the engagement device is in disengagement to interrupt a torque transmission between the prime mover and the drive wheels, and in which none of drive force and braking force are demanded, and to raise a speed of the prime mover from an idling speed with a decrement of the distance to the forerunning vehicle, or with an increment of a vehicle speed, a downgrade of a road, a steering angle, and wherein the speed of the prime mover is raised during the coasting to a maximum speed thereof to be achieved by bringing the engagement device into engagement during the coasting.

2. The running control system as claimed in claim 1, comprising:

a transmission that is disposed between the engagement device and the drive wheels to alter a speed ratio therebetween; and wherein the maximum speed of the prime mover is calculated based on a speed of the vehicle and a speed ratio of the transmission.

3. The running control system as claimed in claim 1, wherein the engagement device is brought into engagement when the vehicle is required to be accelerated.

4. The running control system as claimed in claim 1, wherein the engagement device is brought into engagement when the vehicle is required to be decelerated.

* * * * *

UNITED STATES PATENT AND TRADEMARK OFFICE
CERTIFICATE OF CORRECTION

PATENT NO. : 9,656,655 B2
APPLICATION NO. : 14/424125
DATED : May 23, 2017
INVENTOR(S) : Masaki Mitsuyasu Page 1 of 1

It is certified that error appears in the above-identified patent and that said Letters Patent is hereby corrected as shown below:

At Column 7, Line 13, change the content from:
"coefficient cc based"
To:
"coefficient α based"

At Column 7, Line 27, change the content from:
"coefficient cc is"
To:
"coefficient α is"

Signed and Sealed this
Twenty-ninth Day of May, 2018

Andrei Iancu
*Director of the United States Patent and Trademark Office*